US010222967B2

(12) United States Patent
Fukuda et al.

(10) Patent No.: US 10,222,967 B2
(45) Date of Patent: Mar. 5, 2019

(54) METHOD, APPARATUS, AND COMPUTER PROGRAM FOR SCROLLING A DOCUMENT ON A TOUCH PANEL

(71) Applicant: International Business Machines Corporation, Armonk, NY (US)

(72) Inventors: Susumu Fukuda, Tokyo (JP); Yoshio Horiuchi, Tokyo (JP); Satoko Kinoshita, Tokyo (JP); Kinichi Mitsui, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 382 days.

(21) Appl. No.: 15/226,426

(22) Filed: Aug. 2, 2016

(65) Prior Publication Data

US 2016/0342324 A1 Nov. 24, 2016

Related U.S. Application Data

(63) Continuation of application No. 14/089,787, filed on Nov. 26, 2013, now Pat. No. 9,436,373.

(30) Foreign Application Priority Data

Nov. 30, 2012 (JP) .................................. 2012-261936

(51) Int. Cl.
*G06F 3/048* (2013.01)
*G06F 3/0485* (2013.01)
(Continued)

(52) U.S. Cl.
CPC ........ *G06F 3/04855* (2013.01); *G06F 3/0481* (2013.01); *G06F 3/0483* (2013.01);
(Continued)

(58) Field of Classification Search
CPC .. G06F 3/0483; G06F 3/0488; G06F 3/04883; G06F 3/04847; G06F 3/0485
See application file for complete search history.

(56) References Cited

U.S. PATENT DOCUMENTS 8,347,232 B1 * 1/2013 Prud'Hommeaux ........................
G06F 3/0483
715/776
2010/0056221 A1 * 3/2010 Park ........................ G06F 3/048
455/566
2011/0050594 A1 3/2011 Kim et al.

FOREIGN PATENT DOCUMENTS

JP 05282255 A 10/1993
JP 2009295147 A 12/2009
(Continued)

OTHER PUBLICATIONS

International Search Report for International Application No. PCT/JP2013/075260 filed Nov. 30, 2012; dated Dec. 17, 2013, 2 pgs.

*Primary Examiner* — Phuong H Nguyen
(74) *Attorney, Agent, or Firm* — Cantor Colburn LLP; Maeve Carpenter

(57) ABSTRACT

In one embodiment, a computer-implemented method includes displaying a segment on a touch panel, the segment having a starting point and an end point corresponding to a first page and a last page, respectively, of a document, in response to a predetermined manipulation by a user. An indication is received that the user has performed at least one of touching a point on the segment and sliding a point on the segment. The document is scrolled to reach a page corresponding to the position of the point on the segment, in response to the indication. The document is scrolled, by a computer processor, on a page-by-page basis, in response to the user sliding the point in a direction perpendicular to the segment.

20 Claims, 9 Drawing Sheets

(51) Int. Cl.
    *G06F 3/0483*        (2013.01)
    *G06F 3/0488*        (2013.01)
    *G06F 3/0481*        (2013.01)

(52) U.S. Cl.
    CPC .......... *G06F 3/0485* (2013.01); *G06F 3/0488* (2013.01); *G06F 3/04883* (2013.01); *G06F 3/04886* (2013.01)

(56) References Cited

FOREIGN PATENT DOCUMENTS

| | | |
|---|---|---|
| JP | 2012079156 A | 4/2012 |
| WO | 2010071187 A | 6/2010 |

\* cited by examiner

METHOD, APPARATUS, AND COMPUTER PROGRAM FOR SCROLLING A DOCUMENT ON A TOUCH PANEL

PRIORITY

This application is a Continuation of prior application Ser. No. 14/089,787 having a filing date of Nov. 26, 2013. This application also claims priority to Japanese Patent Application No. 2012-261936, filed Nov. 30, 2012, and all the benefits accruing therefrom under 35 U.S.C. § 119, the contents of which in its entirety are herein incorporated by reference.

BACKGROUND

Embodiments of this disclosure relate to a method for scrolling a document displayed on a touch panel, and more particularly to a document scrolling method, apparatus, and computer program that enable efficient selection of a desired page of a document object.

Recently, various information processors equipped with touch panels have been developed. A touch panel allows a user to manipulate information intuitively by directly touching the display. It allows the user to select or manipulate an object with a single hand. In the case of a document object with a plurality of pages, however, a user is required to perform a large number of manipulations to reach a desired page, which takes a correspondingly long time as well.

Japanese Patent Application Publication No. 05-282255 discloses a scrollbar having starting and end points, where the starting and end points are set to a first page and a last page, respectively, of a document. In response to a user touching an arbitrary point on the scrollbar, a selected page of the document corresponding to the position of the touched point on the scrollbar is displayed.

Japanese Patent Application Publication No. 2012-079156 discloses that, when a user touches any two points on a touch panel or swipes from a point to another point, a scrollbar having the two points as its starting and end points is set virtually, for selection of a desired page of a document.

Japanese Patent Application Publication No. 2012-079156 discloses a technique of performing fine adjustment with regard to an arbitrarily selected time range on a scrollbar.

SUMMARY

In one embodiment, a computer-implemented method includes displaying a segment on a touch panel, the segment having a starting point and an end point corresponding to a first page and a last page, respectively, of a document, in response to a predetermined manipulation by a user. An indication is received that the user has performed at least one of touching a point on the segment and sliding a point on the segment. The document is scrolled to reach a page corresponding to the position of the point on the segment, in response to the indication. The document is scrolled, by a computer processor, on a page-by-page basis, in response to the user sliding the point in a direction perpendicular to the segment.

In another embodiment, an apparatus includes a memory having computer-readable instructions, and a processor for executing the computer-readable instructions. The instructions include a method of displaying a segment on a touch panel, the segment having a starting point and an end point corresponding to a first page and a last page, respectively, of a document, in response to a predetermined manipulation by a user. An indication is received that the user has performed at least one of touching a point on the segment and sliding a point on the segment. The document is scrolled to reach a page corresponding to the position of the point on the segment, in response to the indication. The document is scrolled, by a computer processor, on a page-by-page basis, in response to the user sliding the point in a direction perpendicular to the segment.

In yet another embodiment, a computer program product includes a computer readable storage medium having computer readable program code embodied thereon. The computer readable program code is executable by a processor to perform a method. The method includes displaying a segment on a touch panel, the segment having a starting point and an end point corresponding to a first page and a last page, respectively, of a document, in response to a predetermined manipulation by a user. Further according to the method, an indication is received that the user has performed at least one of touching a point on the segment and sliding a point on the segment. The document is scrolled to reach a page corresponding to the position of the point on the segment, in response to the indication. The document is scrolled on a page-by-page basis, in response to the user sliding the point in a direction perpendicular to the segment.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Conventional techniques have failed to provide a document page designation method with good usability that requires only a small number of consecutive user manipulations for displaying a scale for a document object, and for scrolling the document to reach a desired page of the document object. Some embodiments of this disclosure include methods, apparatuses, and computer programs that enable a document scrolling method with good usability, allowing a user to reach a desired one of a plurality of pages of a document object, smoothly and with a small number of manipulations. With such embodiments, it may be possible for a user to select a desired page of a document object with good usability. No mechanical switches or buttons need be required.

The following embodiments do not restrict the claims, and all of the combinations of features described in the embodiments are not necessarily indispensable. Further, the various embodiments can be carried out in many different modes, and should not be understood as limited to the descriptions given.

While a computer system having a computer program will be described in the following embodiments, it will be apparent to those skilled in the art that some embodiments can be implemented as a computer-executable program. Therefore, the present systems and methods may take the form of: an embodiment as hardware, which may be an apparatus for scrolling a displayed document object and selecting a desired page; an embodiment as software; or an embodiment as a combination of software and hardware. A computer program according to this disclosure can be recorded on a transitory or non-transitory computer-readable recording medium such as a hard disk, a DVD, a CD, an optical storage device, or a magnetic storage device.

Figure 1:
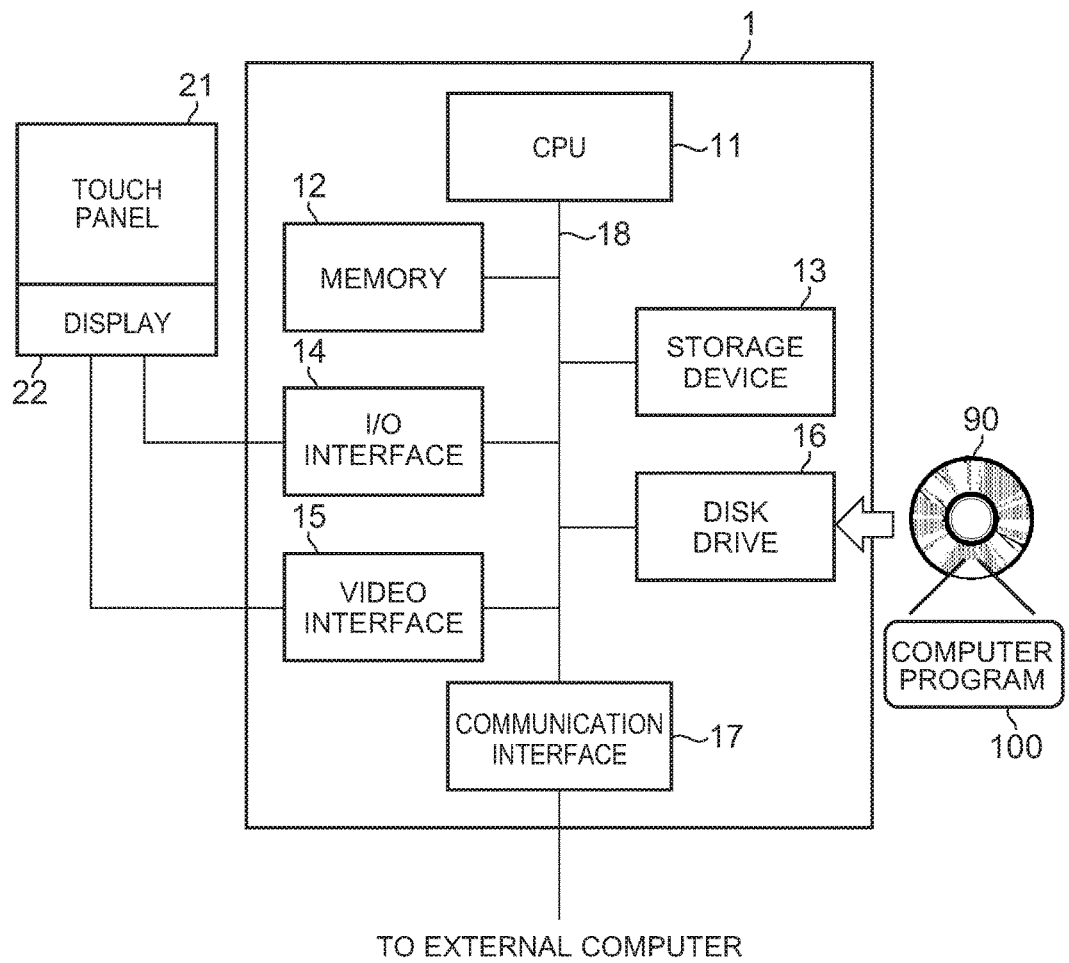
FIG. 1 is a block diagram showing the configuration of an information processor, according to some embodiments of this disclosure.

FIG. 1 is a block diagram showing the configuration of an information processor according to some embodiments of this disclosure. It will be understood that various other configurations may be used for the information processor, and that the embodiment depicted in FIG. 1 is not limiting.

The information processor 1 may include a central processing unit (CPU) 11, a memory 12, a storage device 13, an I/O interface 14, a video interface 15, a disk drive 16, a communication interface 17, and an internal bus 18 connecting the hardware components described above.

In the depicted embodiment, the CPU 11 is connected to the hardware components of the information processor 1 via the internal bus 18, and controls the operations of the hardware components. The CPU 11 also carries out various software functions in accordance with a computer program 100 stored in the storage device 13. In the memory 12, a load module is deployed at the time of execution of the computer program 100. Temporary data generated during the execution of the computer program 100 is also stored in the memory 12.

The storage device 13 is a built-in, fixed storage device such as a ROM. The computer program 100 stored in the storage device 13 has been downloaded, by the disk drive 16, from a portable recording medium 90 such as a DVD, a CD-ROM, or the like recorded with the program and data or other information. At the time of execution, the computer program 100 is copied from the storage device 13 to the memory 12 for execution. The computer program may, in some embodiments, be downloaded from an external computer connected via the communication interface 17.

The communication interface 17 is connected to the internal bus 18. The communication interface 17 is connected to an external network such as the Internet, LAN, WAN, etc., thereby enabling data to be transmitted to and received from an external computer or the like.

The I/O interface 14 is connected to a touch panel 21 for accepting data input. The video interface 15 is connected to a display 22, which is integrated with the touch panel 21, for displaying an image of a document. For selection of a document in a conventional manner, the touch panel 21 and the display 22 may, but need not, be formed in one piece. It should be noted however that, even when the touch panel 21 and the display 22 are separate from each other, the inventive mechanism of scrolling a displayed document object may be effective. A user may designate and select an object being displayed on the display 22, in accordance with this disclosure.

Typical examples of the hardware used in the embodiment shown in FIG. 1 include a smartphone, a mobile phone, and a personal computer equipped with a touch panel. An operating system installed on the hardware may support touch panel operations. Such software may include, for example, Windows 8™.

Figure 2:
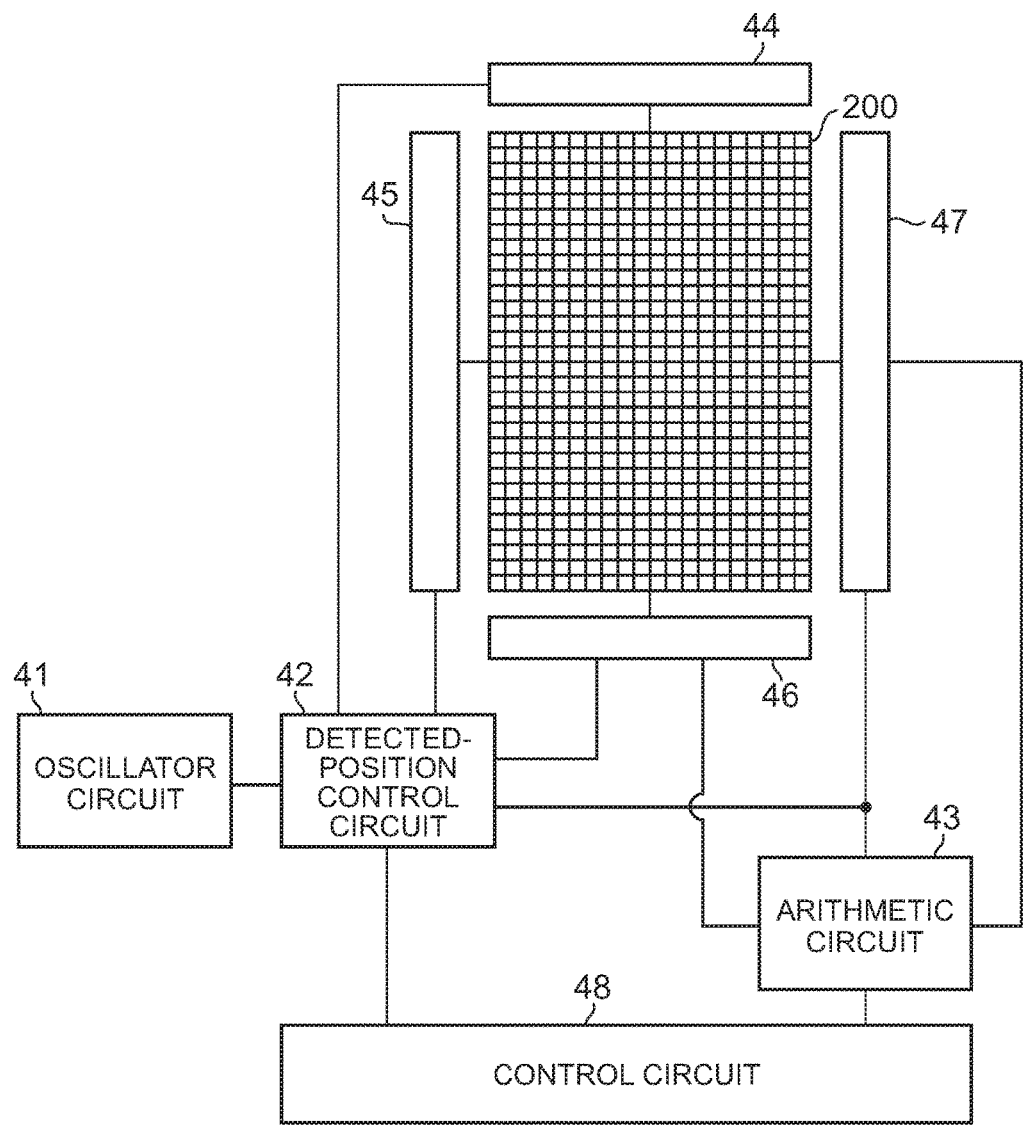
FIG. 2 is a block diagram showing a configuration of a touch panel, according to some embodiments of this disclosure.

FIG. 2 is a block diagram showing a configuration of the touch panel 21 according to some embodiments of this disclosure. As shown in FIG. 2, the touch panel 21 may include a touch panel unit 200, an oscillator circuit 41, a detected-position control circuit 42, an arithmetic circuit 43, an X-axis input-side switch 44, a Y-axis input-side switch 45, an X-axis output-side switch 46, a Y-axis output-side switch 47, and a control circuit 48.

While a typical touch panel structure is shown in FIG. 2, various types of touch panels are known and may be used according to embodiments of this disclosure. There are known manners of detecting a position on the touch panel 21, which include, besides the matrix switch type, a resistive type, a surface acoustic wave type, an infrared type, an electromagnetic induction type, a capacitive type, and various combinations thereof. In the case of the capacitive type, it is possible to measure a distance between the touch panel and a finger or pointer using a capacitance, and it is also possible also detect a physical contact.

The touch panel unit 200 may have X-axis electrode lines for detecting a position in the X-axis direction and Y-axis electrode lines for detecting a position in the Y-axis direction, which lines may be arranged in a matrix. The oscillator circuit 41 may generate pulse signals. The detected-position control circuit 42 may controls the one or more lines to be connected, from among the X-axis or Y-axis electrode lines of the touch panel unit 200.

The arithmetic circuit 43 may detect a signal from the touch panel unit 200 and calculate the position touched by, or in close proximity to, a finger. The X-axis input-side switch 44 may be a switch for inputting a pulse signal to the input end of an X-axis electrode line, and the Y-axis input-side switch 45 may be a switch for inputting a pulse signal to the input end of a Y-axis electrode line. The X-axis output-side switch 46 may be a switch for connecting the output end of an X-axis electrode line to the arithmetic circuit 43, and the Y-axis output-side switch 47 may be a switch for connecting the output end of a Y-axis electrode line to the arithmetic circuit 43.

The control circuit 48 may control the overall operations of the touch panel 21. The control circuit 48 may also instruct the detected-position control circuit 42 to detect any position touched by, or in close proximity to, a finger in the state where a prescribed number (e.g., at least two) of electrode lines are connected. When the detected-position control circuit 42 has detected such a position, the control circuit 48 may further instruct the detected-position control circuit 42 to connect the electrodes in the vicinity of the detected position individually and also connect a prescribed number of electrode lines out of the remaining electrode lines.

The distance between the finger and the touch panel 21 can be estimated in accordance with a fluctuation in electrostatic voltage to obtain, as an output signal from the touch panel 21, information that a finger is in contact with, in close proximity to, or distant from, the touch panel 21.

Figure 3:
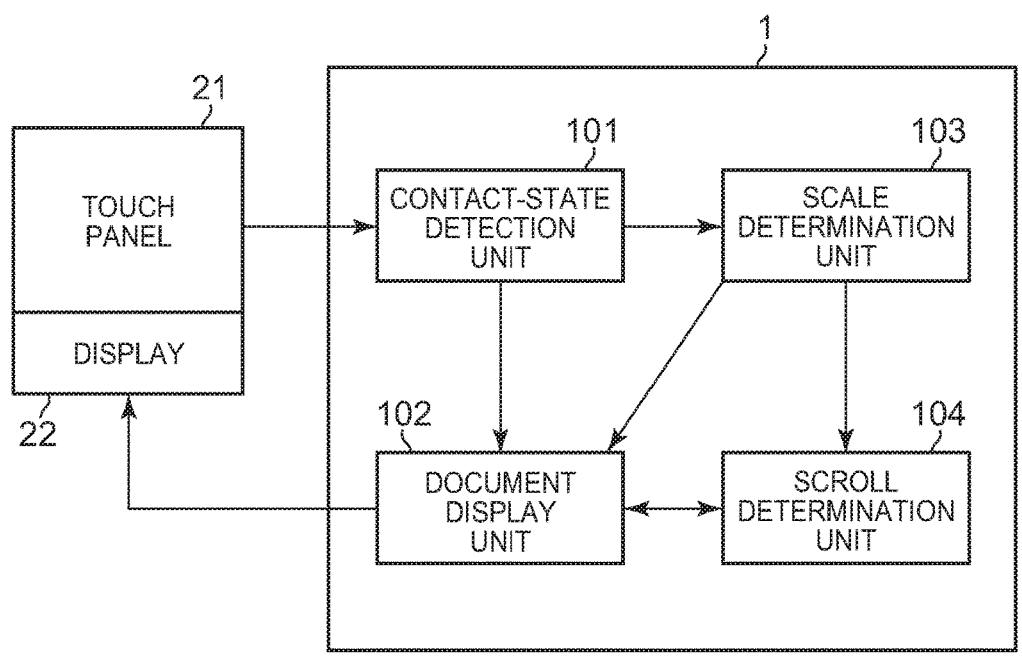
FIG. 3 is a functional block diagram of the information processor, according to some embodiments of this disclosure.

FIG. 3 is a functional block diagram of the information processor 1 according to some embodiments of this disclosure. A description will now be made of an operation of an apparatus that scrolls the displayed pages of a document object for selection of a desired page.

Referring to FIG. 3, a contact-state detection unit 101 in the information processor 1 may receive an output signal from the touch panel 21, and may extract a vertical distance from a fingertip, or a stylus, to the touch panel 21 as well as information regarding the contact state of the finger. Such information regarding the contact state of the finger may include, for example, that the finger is in contact with, in close proximity to, or distant from, the touch panel, which can be determined from the signals output from various sensors in the touch panel 21. In the case where the finger is in close proximity to the touch panel, the distance between the finger and the touch panel 21 may be calculated using, for example, the capacitance between the finger and the touch panel.

A document display unit 102 may display pages of a document in accordance with the information regarding the contact state of a finger. For example, when a user slides his or her finger on a scale, which is a segment-shaped user interface for scrolling, the document display unit 102 may correspondingly scroll the displayed pages of the document, or change to a portion of the document with different page numbers. In the case where the user performs a predetermined manipulation for selecting a page, the document display unit 102 may display the content of the selected page.

When a user uses his or her finger to perform a specific manipulation of designating a starting point and an end point on the touch panel, a scale determination unit 103 may display a scale on the display. The scale may be used for designating the document page being selected.

When a user's touch is detected at a point on the scale, a scroll determination unit 104 may display, on the display, the document page number corresponding to the touched position on the scale. In response to the user touching a point on the scale or moving the touched point on the scale, the scroll determination unit 104 may displays, e.g., near the document, the document page number corresponding to the position of the point on the scale. When the user performs a specific manipulation for fine adjustment of pages, the scroll determination unit 104 may perform a detailed page number display that enables the page number to be changed on a page-by-page basis.

Figure 4:
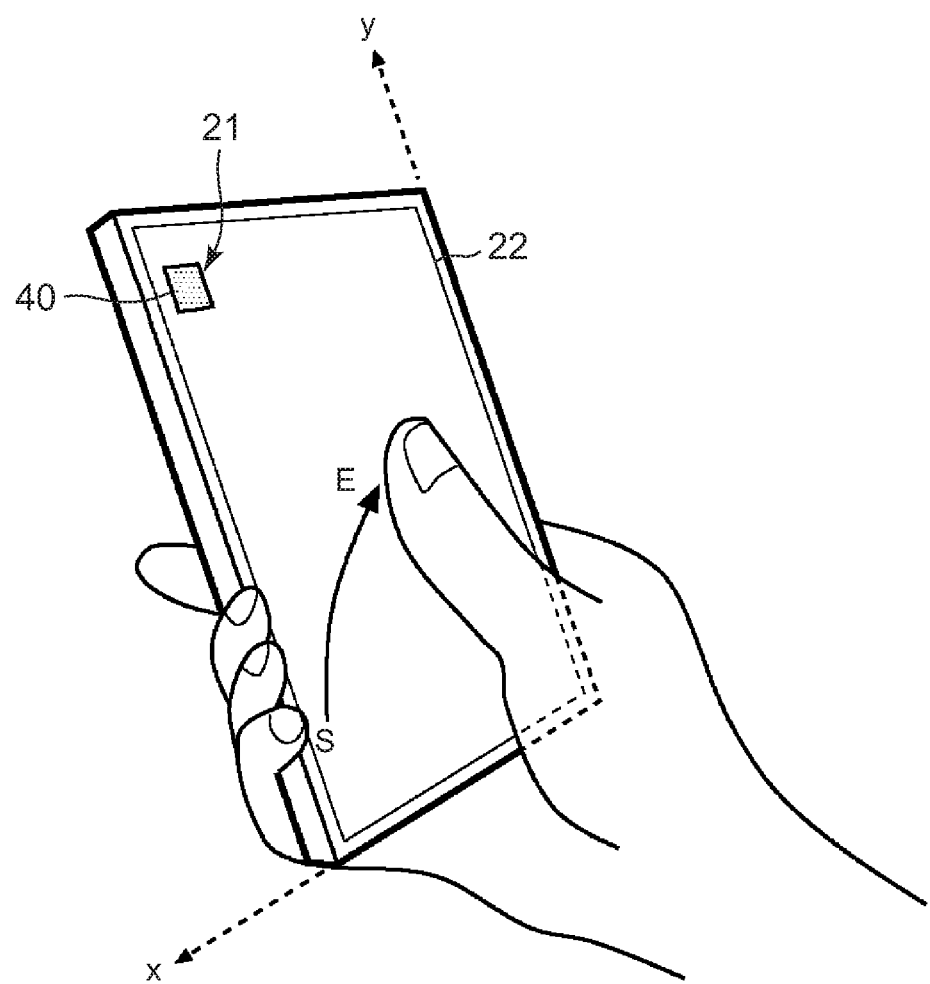
FIG. 4 shows a bird's-eye view of a thumb and the information processor, according to some embodiments of this disclosure.

FIG. 4 shows a bird's-eye view of a thumb and the information processor 1 according to some embodiments of this disclosure. First, a document object 40 is selected and displayed on the display 22. In the state where the document object 40 has been selected, after a predetermined manipulation is performed, a scale mode may be entered. The object 40 may be displayed in large size on the display 22 at the time of initiating the scale mode. When the user moves the thumb from a starting point S to an end point E on the touch panel and then lifts it off the touch panel, then the scale for use in selecting a document page may be displayed. In some embodiments, two fingers may be used to designate the two points (S, E), instead of swiping one finger or thumb.

The scale mode may be entered in various manners. For example, a user may touch the document object 40 with a finger and slide it from side to side; a user may touch the object 40 twice or three times consecutively; a user may touch two points on the touch panel while placing another finger on the object 40; or a user may keep touching the object 40 with a finger for a prescribed period of time. Alternatively, in the case where the information processor 1 is equipped with an acceleration sensor, a user may shake the main body to enter the scale mode. In some embodiments, the main body may include a hardware switch dedicated to the scale mode.

Figure 5:
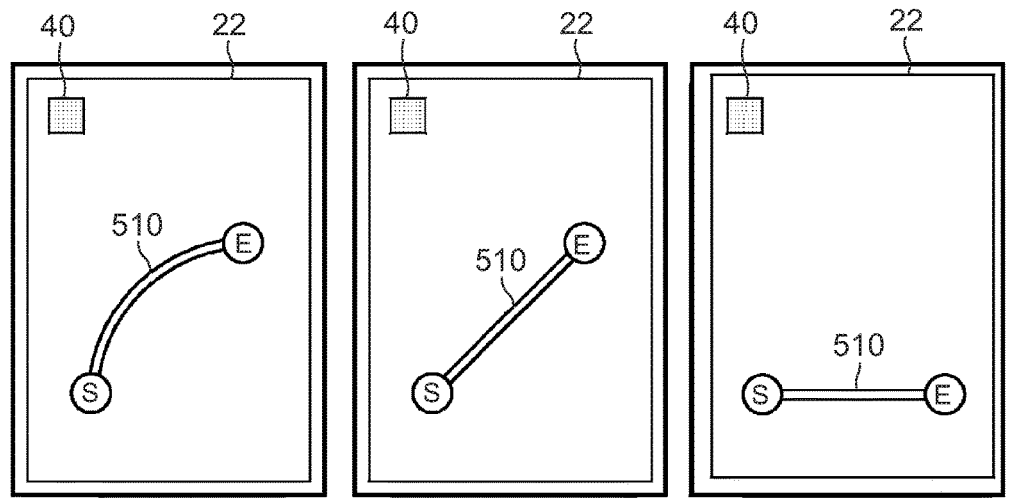
FIG. 5 shows examples of an inventive scale, according to some embodiments of this disclosure.

FIG. 5 shows examples of the inventive scale, according to some embodiments. In the example on the left, a scale 510 having a starting point S and an end point E is displayed when a user has moved his or her finger from the point S to the point E on the display 22, at touch panel 21, to draw an arc shape. In the center example, a scale 510 is displayed as a diagonal straight line connecting the starting point and the end point. In the example on the right, a scale is displayed which has the starting and end points at predetermined positions. Various embodiments of this disclosure may work in any of these manners. According to the present invention, a scale for displaying the document pages can be generated between two points in various locations.

Figure 6:
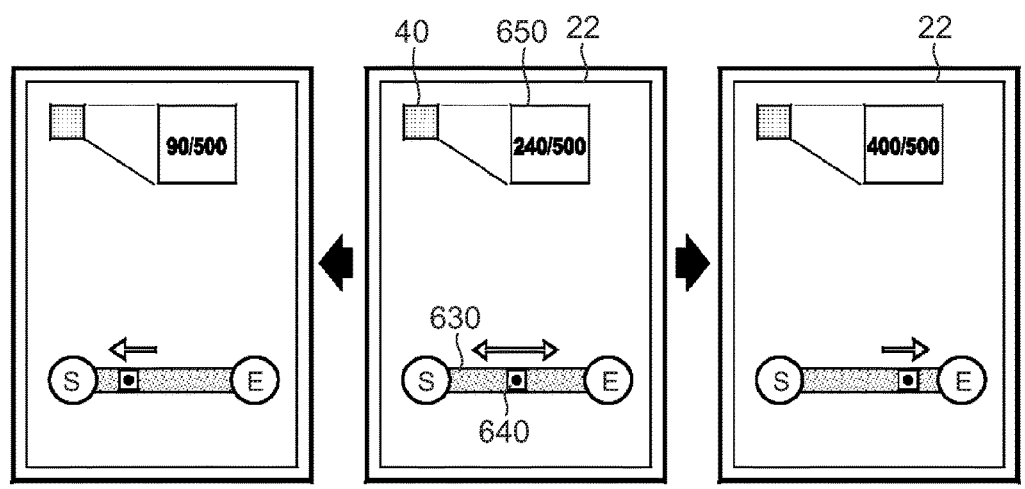
FIG. 6 illustrates a case where a user has touched an arbitrary point on the scale, according to some embodiments of this disclosure.

FIG. 6 illustrates the case where a user has touched an arbitrary point on a scale. In the case where the point (referred to as "X") the user has touched is off the scale, it may be assumed that the user has touched a point X' (not shown) of intersection between the segment SE and a vertical line extended from the point X to the segment SE. The center view in FIG. 6 shows the state where a user has touched a point almost at the center of the scale 630. In the case where the document object has 500 pages, the left end S of the scale corresponds to page 1, and the right end E corresponds to page 500. In the center view, information indicating that the touched point corresponds to page 240 of the document is displayed in the vicinity of the document object 40. In some embodiments, both the highest page number and the selected page number may be displayed. The content of the selected page may be displayed in addition to the page number information.

The left view shows the state where, while touching the arbitrary point on the scale 630, the user has slid the finger to the left on the scale, and the right view shows the state where the user has slid the finger to the right on the scale. As the user slides the finger on the scale, in accordance with the points on the scale touched by the user, the page numbers may be correspondingly scrolled and displayed near the document object 40. The document content may also be displayed and scrolled correspondingly. While it is assumed in this example that the finger is in contact with the touch panel during scrolling, this need not be the case. Where the configuration is capable of detecting a close proximity state of a finger, even when a finger is not in contact with the touch panel, it may be determined that the finger has effectively touched the point. In other words, a user may scroll the page numbers by sliding a finger in the air.

Figure 7:
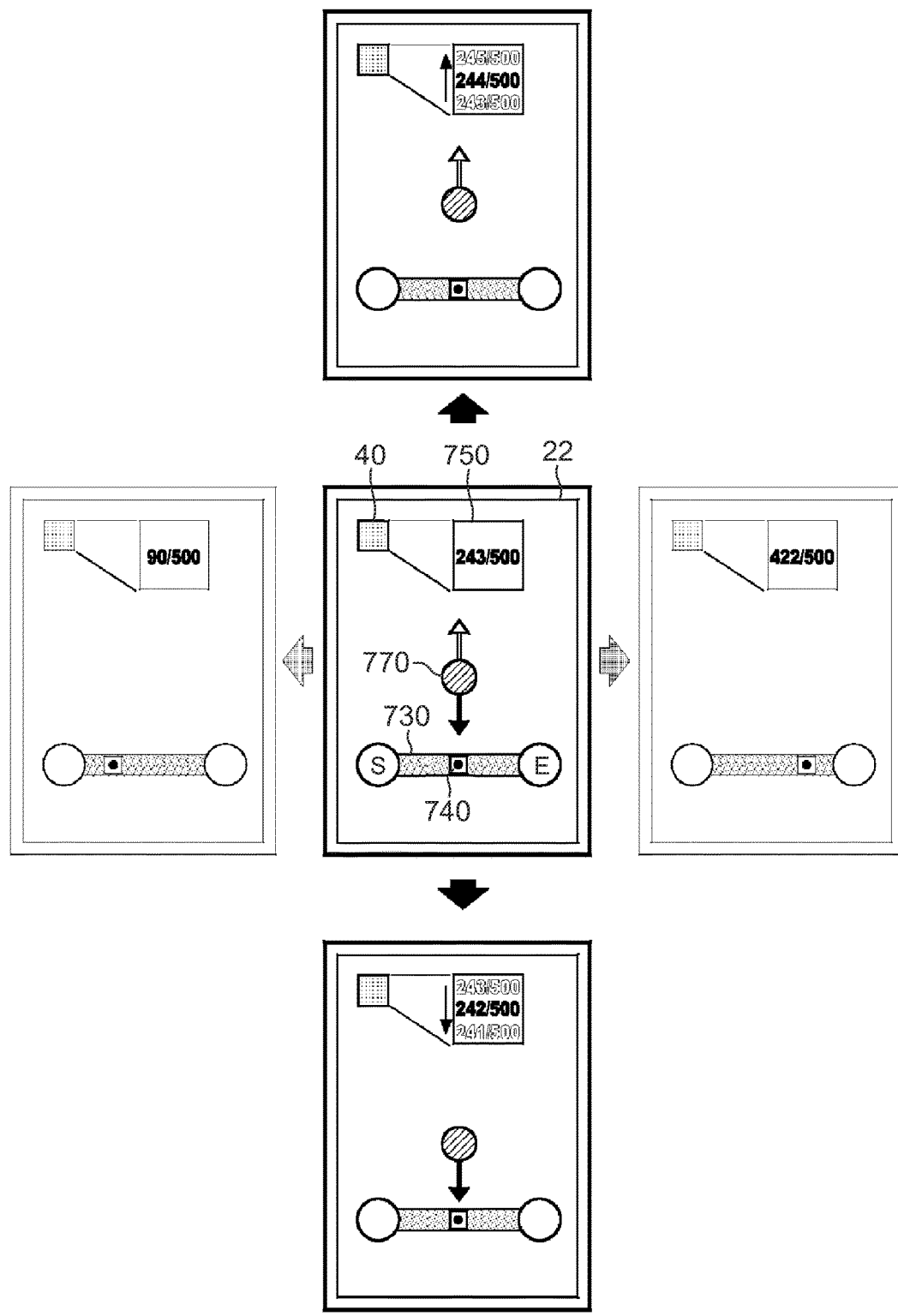
FIG. 7 illustrates a fine-adjustment mode, which is another feature of some embodiments of this disclosure.

FIG. 7 illustrates a fine-adjustment mode, which may be a feature of some embodiments. In the case of a document having some tens of pages, the scale mode may be sufficient to reach a desired page. In the case of a document having some hundreds of pages, however, a delicate page selection may not be possible in the scale mode. The present invention ma therefore provide the fine-adjustment mode.

In the center view of FIG. 7, a user has touched an arbitrary point 740 on the scale, and the page number is displayed as "240/500", as in the center view in FIG. 6. Here, the user can slide the finger upward from the point 740 to a point 770, to scroll the page numbers slightly to "243/500". In some embodiments, adjustment on a page-by-page basis may be enabled. When the user moves the finger farther upward or downward, the displayed page numbers may be scrolled on a page-by-page basis, as shown in the upper or lower view in FIG. 7. The left and right views in FIG. 7 are identical to those in FIG. 6.

Figure 8:
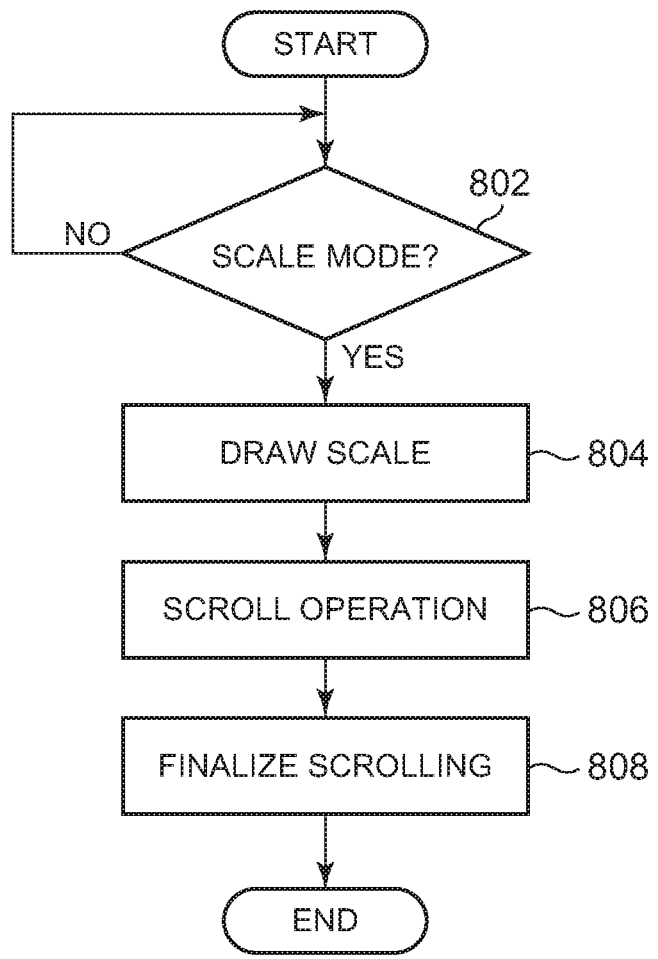
FIG. 8 is a flowchart illustrating an overall operation of some embodiments of this disclosure.

FIG. 8 is a flowchart illustrating an example overall operation according to some embodiments of this disclosure. In FIG. 8, it is assumed that a document object 40 has been selected. First, at block 802, it is determined whether the scale mode has been entered. If so, the process proceeds to block 804. At block 804, a scale is displayed on the display 22. Preferably, the scale is displayed in the form of a segment (e.g., an arc, a straight line, or another prescribed segment) connecting the starting point S and the end point E of a user manipulation of swiping a finger on the display 22. Alternatively, it may be configured to cause the user to touch two points to designate the starting and end points. The starting and end points of the scale may correspond to the first and last pages, respectively, of the document object.

Next, at block 806, a scroll operation is controlled. In response to the user touching an arbitrary point on the scale, the document page number corresponding to the point on the scale segment is displayed in the vicinity of the document object. The content of the document may also be displayed. As the user moves the finger on the scale while keeping it in contact with the scale, the displayed page numbers are scrolled correspondingly.

Further, in response to the user moving the finger in the direction perpendicular to the scale segment, the mode shifts to the fine-adjustment mode. In the fine-adjustment mode, the page number may be changed on a page-by-page basis. In some cases, in the fine-adjustment mode, another segment is displayed in the direction perpendicular to the scale segment. This can notify the user of the fine-adjustment mode and also indicate the direction in which the user needs to move the finger. The page number increases as the user moves the finger upward, and the page number decreases as the user moves the finger downward, although the opposite may also be the case.

In the scale and fine-adjustment modes, close proximity state of the finger may be detected so as to enable scrolling in accordance with a finger sliding gesture in the air. That is, in the case where the distance between the touch panel 21 and the finger is a predetermined distance or less, it may be deemed that the finger is in contact with the touch panel, such that the user manipulation of sliding the finger even in the air is accepted.

Lastly, at block 808, the scrolling is finalized. The finalization of scrolling refers to the state where the page has been selected. The content of the page of the document object is displayed in large size on the display 22. A page may be displayed in large size on the display at the time when the scale mode has been entered, and the pages may be displayed in large size through the user manipulations on the scale.

The scrolling is finalized when a predetermined manipulation is made in each mode. For example, when the distance between the touch panel and the finger has become a predetermined distance or more, when the document object has been selected again, when the acceleration sensor has output a signal as the user shook the hardware, or when the finger has stayed at a same position for a predetermined time or longer, then the scrolling may be finalized. In some embodiments, the apparatus may be provided with a dedicated hardware switch for indicating that finalization is desured.

Figure 9:
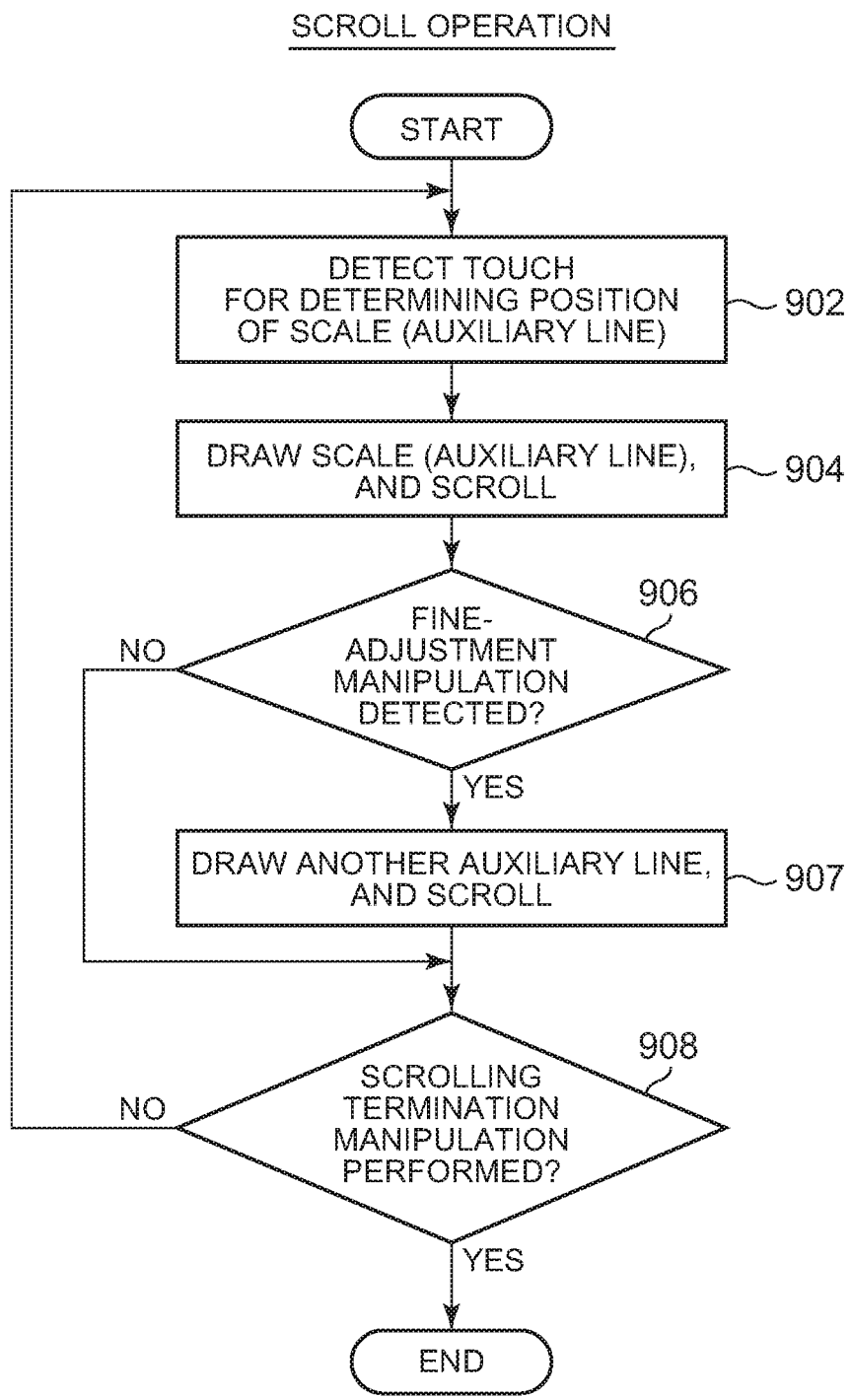
FIG. 9 is a detailed flowchart of a scroll operation, according to some embodiments of this disclosure.

FIG. 9 is a detailed flowchart of the scroll operation, according to some embodiments of this disclosure. It is here assumed that the scale mode has already been entered. First, at block 902, a user manipulation of touching the panel for determining the position where a scale for scrolling a document is to be displayed is detected.

For example, when a user has swiped a finger on the display 22, the corresponding segment may be drawn as a scale, with the first and last points of the segment corresponding respectively to the starting and end points of the scale. As the user moves the finger on this scale, the pages of the document are scrolled. Alternatively, it may be configured such that the user can touch two points to determine the starting and end points. Still alternatively, a scale having the starting and end points at predetermined positions may be displayed.

Next, at block 904, the scale is drawn, and the user is allowed to trace the scale to scroll the document pages. At block 906, it is determined whether a fine-adjustment manipulation has been performed. Whether the fine-adjustment mode has been entered may be determined according to whether the user has moved a finger in the direction perpendicular to the scale segment.

If the fine-adjustment mode is on, at block 907, an auxiliary line perpendicular to the scale segment is drawn. This informs the user that the current mode is the fine-adjustment mode and that the user can perform a manipulation of moving a finger in the up-and-down direction. Further, in accordance with the amount of movement of the finger in the up-and-down direction, the page numbers are scrolled on a page-by-page basis.

Lastly, at block 908, it is determined whether a scrolling termination manipulation, i.e., finalization of scrolling, has been performed. The finalization of scrolling refers to the state where the page has been selected. For example, when the distance between the finger and the touch panel has become a predetermined distance or more, when the document object has been selected again, when a signal from the acceleration sensor has been detected, or when the finger has stayed at a same position for a prescribed time or longer, then the scrolling may be deemed finalized.

Figure 10:
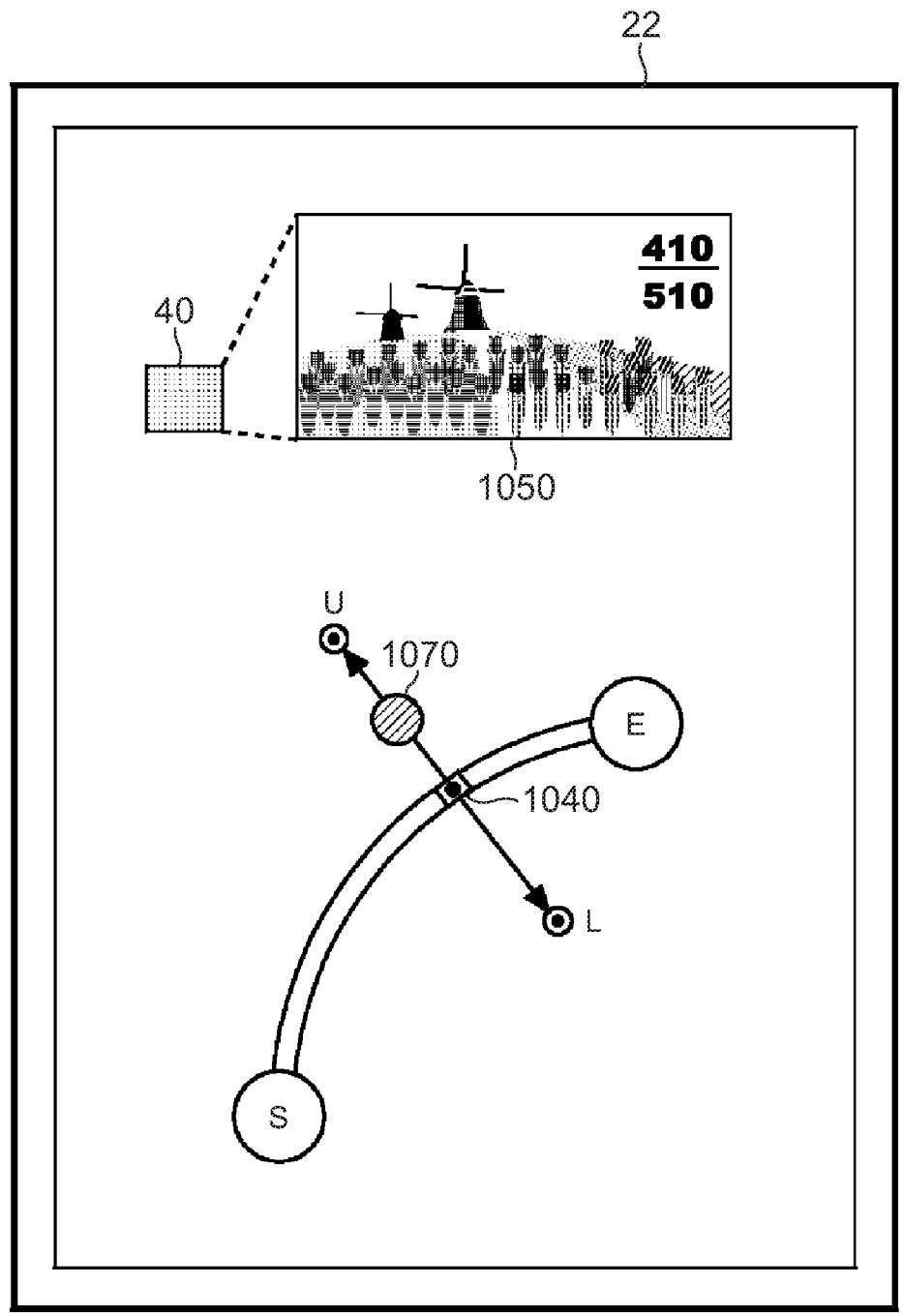
FIG. 10 shows an operation example, according to some embodiments of this disclosure.

FIG. 10 shows, by way of example, a typical operation according to some embodiments of this disclosure. When a user touches a document object 40 and slides the object side to side while touching it, the scale mode may be entered. When the user moves a finger from a point S to a point E on the display 22, a scale of an arc shape having the starting point S and the end point E is drawn. When a document object has 510 pages in total, the starting point S corresponds to page 1, and the end point E corresponds to page 510.

When the user touches a point 1040 on the scale, the corresponding page on the scale segment, which is "410/510", is displayed in the vicinity of the document object 40. When the user moves the finger upward from the point 1040, the mode is switched to the fine-adjustment mode. In the fine-adjustment mode, another auxiliary line having a starting point L and an end point U in the direction perpendicular to the scale segment is drawn additionally.

While the fine-adjustment mode in this example enables the page numbers to be scrolled on a page-by-page basis, or by another basis, the page numbers may be scrolled in units of a quantity of pages. As the user moves the finger to a point 1070 in the direction toward the end point U, the page number displayed may be increased on a page-by-page basis, and the page number and the content of the page are displayed in a window 1050 in the vicinity of the document object. As the user moves the finger in the direction toward the starting point L, the page number displayed is decreased on a page-by-page basis. During the movement of a finger, when the finger deviates from the auxiliary line, the point X' of intersection between the segment UL and a vertical line extended from the position (i.e., point X) of the finger to the segment UL is calculated as the position of the finger. That is, in some embodiments, only the vector value in the segment UL direction is calculated.

The various embodiments of this disclosure are not limited to the above-described examples. Rather, various modifications or improvements are possible within the scope of this disclosure. For example, in each mode, the close proximity state of a finger or thumb may be detected, and the scrolling may be enabled without a direct contact with the touch panel. Further, in the fine-adjustment mode, the mode may be returned to the scale mode when the scale is touched again. Furthermore, a stylus may be used to perform manipulations on the touch panel, as opposed to, or in addition to, a finger or a thumb. In some embodiments, the various operations involved in the scrolling may be modified, such that the exact actions described above to be taken by a user are not limiting. Actions may be added or removed depending on specific implementations. Accordingly, various modified embodiments are conceivable.

What is claimed is:

1. A computer-implemented method, comprising:
   displaying an initial segment on a touch panel, the initial segment having a starting point and an end point corresponding to a first page and a last page, respectively, of a document, in response to a predetermined manipulation by a user;
   said predetermined manipulation by the user including actuating contact with said touch panel at a first position designating an initial segment starting point corresponding with a first page and actuating contact with said touch panel at a second position designating an initial segment end point corresponding with a last page;
   scrolling the document utilizing the initial segment to reach a page corresponding to the position of the point on the initial segment, in response to an indication;
   detecting activation of a fine-adjustment mode during the scrolling of the initial segment;
   displaying a fine-adjustment segment on the touch panel corresponding to the fine-adjustment mode; and
   scrolling the document on a page-by-page basis in response to the user sliding a point along the fine-adjustment segment.

2. The method according to claim 1, wherein the initial segment end point is defined either by swiping across said touch panel while maintaining contact with said touch panel or by touching said touch panel at a location defining an end.

3. The method according to claim 1, wherein the fine-adjustment segment has a predetermined length defining a range of pages which may be identified by scrolling along the fine-adjustment segment.

4. The method according to claim 1, further comprising, at the time of scrolling the document to reach the page, displaying a current page number and a content of the page in a window in the display while simultaneously displaying both the fine-adjustment and initial segment on the display.

5. The method of claim 4 further comprising determining when the scrolling is finalized, and removing the display of the content in a window and the display of the fine-adjustment and initial segment for the displaying of the selected page on the display in a readable size larger than the window.

6. The method according to claim 1, further comprising extending the fine-adjustment segment in a direction perpendicular to the initial segment.

7. An apparatus comprising:
   a memory having computer-readable instructions; and
   a processor for executing the computer-readable instructions, the instructions including a method comprising:
      displaying an initial segment on a touch panel, the initial segment having a starting point and an end point corresponding to a first page and a last page, respectively, of a document, in response to a predetermined manipulation by a user;
      receiving an indication that the user has performed at least one of touching a point on the segment and sliding a point on the segment;
      scrolling the document to reach a page corresponding to the position of the point on the segment, in response to the indication;
      detecting activation of a fine-adjustment mode;
      displaying a fine-adjustment segment on the touch panel corresponding to the fine-adjustment mode; and
      scrolling the document on a page-by-page basis in response to the user sliding a point along the fine-adjustment segment.

8. The apparatus according to claim 7, the wherein the predetermined manipulation by the user includes actuating contact with said touch panel at a first position designating a segment starting point corresponding with a first page and actuating contact with said touch panel at a second position designating a segment end point corresponding to the last page, said actuation contact defining said segment end point being conducted either by swiping across said touch panel while maintaining contact with said touch panel or by touching said touch panel at a location defining an end point.

9. The apparatus according to claim 7, wherein the initial segment has at least one of a shape of a straight line connecting the starting point and the end point and the shape of a curve traced by the user.

10. The apparatus according to claim 7, wherein at the time of scrolling the document to reach the page, a current page number and a content of the page are displayed in a window while the initial segment and fine-adjustment segment are simultaneously displayed on a display.

11. The apparatus according to claim 7, wherein the fine-adjustment segment has a predetermined length defining a range of pages which may be identified by scrolling along the fine-adjustment segment.

12. The apparatus according to claim 7, the method further comprising determining when the scrolling is finalized, and removing the display of the content in a window and the display of the fine-adjustment and initial segment for the displaying of the selected page on the display in a readable size larger than the window.

13. The method according to claim 7, further comprising extending the fine-adjustment segment in a direction perpendicular to the initial segment.

14. A computer program product comprising a computer readable storage medium having computer readable program code embodied thereon, the computer readable program code executable by a processor to perform a method comprising:
  displaying an initial segment on a touch panel, the initial segment having a starting point and an end point corresponding to a first page and a last page, respectively, of a document, in response to a predetermined manipulation by a user;
  receiving an indication that the user has performed at least one of touching a point on the segment and sliding a point on the segment;
  scrolling the document to reach a page corresponding to the position of the point on the segment, in response to the indication;
  detecting activation of a fine-adjustment mode;
  displaying a fine-adjustment segment on the touch panel corresponding to the fine-adjustment mode; and
  scrolling the document on a page-by-page basis in response to the user sliding a point along the fine-adjustment segment.

15. The computer program product of claim 14, wherein the predetermined manipulation by the user includes actuating contact with the touch panel at a first position designating an initial segment starting point corresponding with a first page and actuating contact with said touch panel at a second position designating an initial segment end point corresponding to the last page, said actuation contact defining said initial segment end point being conducted either by swiping across said touch panel while maintaining contact with said touch panel or by touching said touch panel at a location defining an end point.

16. The computer program product of claim 14, wherein the initial segment has at least one of a shape of a straight line connecting the starting point and the end point and a shape of a curve traced by the user.

17. The computer program product of claim 14, wherein at the time of scrolling the document to reach the page, a current page number and a content of the page are displayed in a window while the initial segment and fine-adjustment segment are simultaneously displayed on a display.

18. The computer program product of claim 14 further comprising determining when the scrolling is finalized, and removing the display of the content in a window and the display of the fine-adjustment and initial segment for the displaying of the selected page on the display in a readable size larger than the window.

19. The computer program product of claim 14 further comprising determining when the scrolling is finalized, and removing the display of the content in a window and the display of the fine-adjustment and initial segment for the displaying of the selected page on the display in a readable size larger than the window.

20. The computer program product of claim 14, further comprising extending the fine-adjustment segment in a direction perpendicular to the initial segment.

\* \* \* \* \*